(12) United States Patent
Kohira et al.

(10) Patent No.: US 6,657,820 B2
(45) Date of Patent: *Dec. 2, 2003

(54) MAGNETIC HEAD SLIDER

(75) Inventors: Hidekazu Kohira, Ninomiya (JP); Masaaki Matsumoto, Fujisawa (JP); Hideaki Tanaka, Odawara (JP); Akira Matsuda, Odawara (JP); Shozo Saegusa, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/199,200

(22) Filed: Jul. 19, 2002

(65) Prior Publication Data

US 2002/0191341 A1 Dec. 19, 2002

Related U.S. Application Data

(63) Continuation-in-part of application No. 09/761,734, filed on Jan. 8, 2001, now Pat. No. 6,556,381.

(30) Foreign Application Priority Data

Oct. 12, 2001 (JP) .......................................... 2001-314721

(51) Int. Cl.⁷ ................................................. G11B 5/60
(52) U.S. Cl. ................................ 360/236.3; 360/235.7; 360/235.8
(58) Field of Search ...................... 360/234.7, 235.7, 360/236.3, 236.1, 235.8

(56) References Cited

U.S. PATENT DOCUMENTS

| | | | | |
|---|---|---|---|---|
| 5,404,256 A | * | 4/1995 | White | 360/236.3 |
| 5,825,587 A | | 10/1998 | Bolasna et al. | |
| 6,144,529 A | * | 11/2000 | Wada et al. | 360/236.8 |
| 6,351,345 B1 | * | 2/2002 | Kameyama | 360/236.3 |
| 6,396,664 B2 | * | 5/2002 | Koishi et al. | 360/235.8 |
| 6,424,494 B1 | * | 7/2002 | Koishi | 360/235.6 |
| 6,462,909 B1 | * | 10/2002 | Boutaghou et al. | 360/235.8 |
| 6,525,909 B1 | * | 2/2003 | Qian et al. | 360/235.7 |
| 6,556,381 B2 | * | 4/2003 | Kohira et al. | 360/236.3 |

* cited by examiner

Primary Examiner—Robert S. Tupper
(74) Attorney, Agent, or Firm—Townsend and Townsend and Crew LLP

(57) ABSTRACT

A magnetic head slider has a magnetic head mounting surface holding a magnetic head, to be kept closest to a magnetic disk when the magnetic head slider is in operation, a slider rail surface contiguous with a surface, on the side of an air inlet end, and opposite sides of a portion, near an air outlet end, of the magnetic head and extending near to the air outlet end, a step bearing surface formed at least on the side of the air inlet end of the slider rail surface, and a negative-pressure groove formed so as to surround the step bearing surface. The magnetic head mounting surface is typically formed on an alumina protective film protecting the magnetic head. The variation of the flying height of the magnetic head slider with respect to a rolling direction is reduced and a proximity ability to approach the magnetic disk is improved.

20 Claims, 6 Drawing Sheets

MAGNETIC HEAD SLIDER

This application is a continuation-in-part of U.S. application Ser. No. 09/761,734, filed Jan. 18, 2001, which claims priority from Japanese Patent Application No. 2000-112437, filed Apr. 13, 2000. This application is related to and claims priority from Japanese Patent Application No. 2001-314721, filed Oct. 12, 2001. The entire disclosures of these applications are incorporated herein by reference.

BACKGROUND OF THE INVENTION

The present invention relates to a magnetic disk drive and, more particularly, to a magnetic head slider support structure capable of reducing the variation of the floating height or flying height of a magnetic head slider with respect to a rolling direction from a magnetic disk and of improving the approach ability or proximity ability of a magnetic head slider to approach a magnetic disk.

To increase recording density of a magnetic disk drive, it is important to reduce the flying height of a magnetic head slider holding a magnetic head with respect to a rolling direction from a surface of a magnetic disk, i.e., to reduce a clearance between the magnetic head slider and the magnetic disk, and to improve the proximity ability of the magnetic head slider to approach a magnetic disk.

The variation of the static attitude of a suspension supporting the magnetic head slider is a principal cause of variation of the flying height of the magnetic head slider with respect to a rolling direction. If the static attitude around the roll axis of the suspension varies, the magnetic head slider tilts about the roll axis. Consequently, the magnetic head cannot be disposed close to the magnetic disk and the danger of the edge of a slider rail surface coming into contact with the magnetic disk increases.

A related magnetic head slider capable of reducing the variation of the flying height with respect to a rolling direction of the magnetic head slider is disclosed in U.S. Pat. No. 5,825,587. In this magnetic head slider, an outlet end portion of a center rail provided with a magnetic head is formed in a narrow width to reduce the variation of the minimum flying height, i.e., the flying height of the lowest portion of a magnetic head slider, when the magnetic head slider tilts about the roll axis. The lowest portion is the edge of the outlet end portion of a rail surface.

The proximity ability of the slider is the ability of the magnetic head slider to follow roughness and wavinesses formed on the surface of a magnetic disk formed by various causes. Roughness and wavinesses formed on a magnetic disk include, for example, minute irregularities or roughness having wavelengths not greater than several microns and height not greater than several nanometers as measured by an atomic force microscope (AFM); minute undulations (micro-waviness) having wavelengths in the range of several tens micrometers to about 1 mm and height of several nanometers as measured by a laser Doppler vibrometer (LDV); and runouts having wavelengths in the range of several millimeters to several tens millimeters.

Most of minute roughness and minute wavinesses (micro-wavinesses) are those existing on the substrate of the magnetic disk inherently and lapping marks formed by a lapping process. The runouts are formed by distortion when the magnetic disk is clamped. Desirably, a magnetic head slider is capable of properly following any one of those wavinesses. If the magnetic head slider is unable to follow large irregularities, the edge of the outlet end portion of the rail surface at the lowest flying height from a magnetic disk is liable to come into contact with the magnetic disk.

BRIEF SUMMARY OF THE INVENTION

The reduction of the flying height of a magnetic head slider with respect to the entire surface of a magnetic disk, the reduction of the variation of flying height of the magnetic head slider and the improvement of the proximity ability of the magnetic disk slider to approach the magnetic disk are principal matters to be achieved to enhance recording density, maintaining the reliability of a magnetic disk drive.

U.S. Pat. No. 5,825,587 mentions the capability of a magnetic head slider to reduce the variation of its flying height with respect to a rolling direction, but does not describe the proximity ability of the magnetic disk slider to approach a magnetic disk. The improvement of the proximity ability of magnetic head slider has been desired.

The present invention has been made under such circumstances and it is therefore a feature of the present invention to provide a magnetic head slider capable of reducing the variation of its flying height with respect to a rolling direction, namely, static flying height variation, and of improving the proximity ability to approach a magnetic disk, namely, dynamic variation of flying height to follow the magnetic disk.

Another feature of the present invention relates to a magnetic disk drive provided with such a magnetic head slider.

According to an aspect of the present invention, a magnetic head slider has a length between an air inlet end and an air outlet end, and includes: a magnetic head; and a slider rail having a slider rail surface which is contiguous with side surfaces and an air inlet end surface of the magnetic head, a step bearing surface formed on the air inlet side in a predetermined depth from the slider rail surface, and a negative-pressure groove of a predetermined depth from the step bearing surface.

In one embodiment, the magnetic head is supported by a magnetic head mounting surface of the magnetic head mounting member. The slider rail surface includes an end portion disposed near the air outlet end. The end portion extends with the entire width to the magnetic head mounting member near the air outlet end. The width of the end portion may be uniform. The magnetic head mounting member may be a protective film that protects the magnetic head.

In another embodiment, the slider rail surface includes an end portion disposed near the air outlet end. The end portion extends at least to the protective film protecting the magnetic head near the air outlet end. The end portion may include a beveled extension extending from a boundary of the protective film beyond the magnetic head toward the air outlet end and narrowing in width toward the air outlet end.

In another embodiment, the slider rail surface includes an end portion disposed near the air outlet end. The end portion extends to the magnetic head near the air outlet end. The end portion includes a tapered part which has a width continuously increasing from one end adjacent the magnetic head in a direction toward the air inlet end. The end portion may include a uniform part which extends with a uniform width from the tapered part to another end of the end portion in a direction toward the air inlet end.

In this specification, a dimension between an air inlet side and an air outlet side is called a "length" and a dimension perpendicular to the length is called a "width", and a dimension in a direction from a magnetic disk toward the magnetic head slider is called a "depth" in describing the shape of magnetic head sliders. A state where a magnetic head slider is floating or flying above a magnetic disk to read

DETAILED DESCRIPTION OF THE INVENTION

Figure 1:
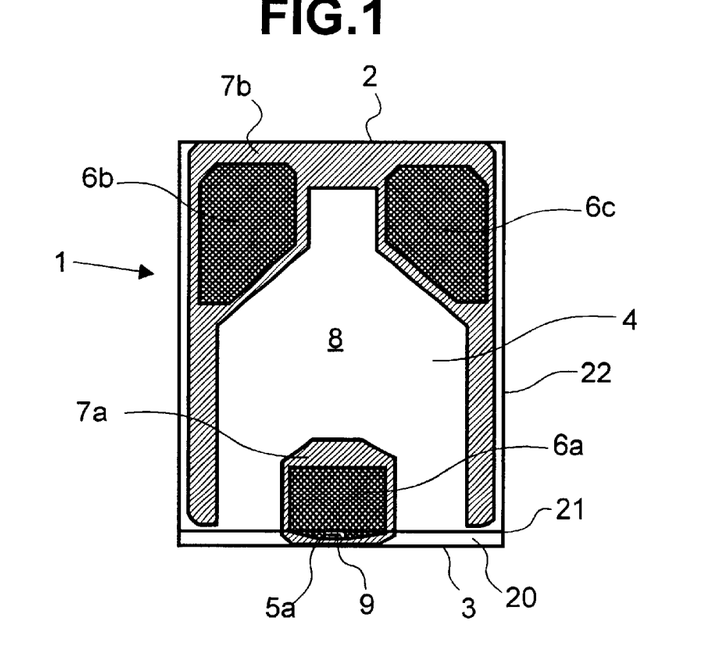
FIG. 1 is a plan view of a magnetic head slider in a first embodiment according to the present invention.

Magnetic head sliders in preferred embodiments according to the present invention and a magnetic disk drive provided with the magnetic head slider will be described with reference to the accompanying drawings. FIG. 1 is a plan view of a magnetic head slider in a first embodiment according to the present invention, FIG. 2 is an enlarged plan view of a center rail included in the magnetic head slider shown in FIG. 1, and FIG. 3 is a sectional view taken along line A—A in FIG. 2.

Figure 2:
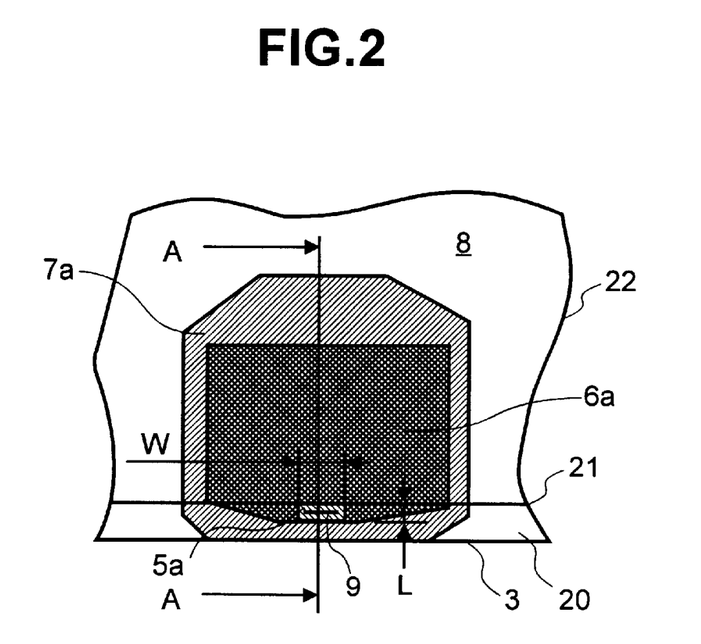
FIG. 2 is an enlarged plan view of a center rail included in the magnetic head slider in the first embodiment.
Figure 3:
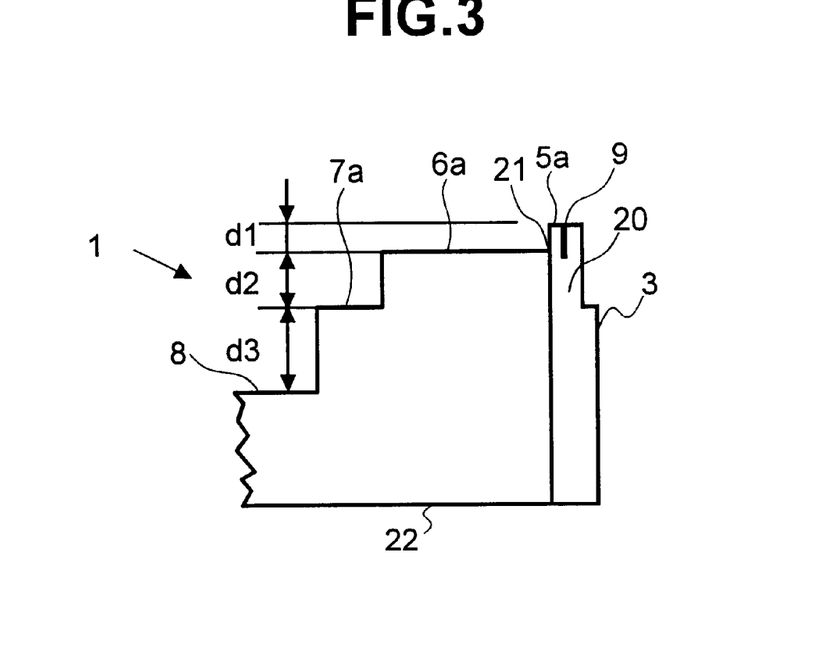
FIG. 3 is a sectional view taken on line A—A in FIG. 2.

Referring to FIGS. 1, 2 and 3, the magnetic head slider 1 in the first embodiment has an air inlet end 2, an air outlet end 3, and an air-bearing surface 4. The air bearing surface 4 has a first surface formed by a first surface forming part 5a, which is the closest to a magnetic disk when the magnetic head slider 1 is disposed opposite to a magnetic disk, not shown, as an information recording medium; second surfaces, which are farther from the magnetic disk than the first surface, formed by second surface forming parts 6a, 6b and 6c; third surfaces, which are farther from the magnetic disk than the second surfaces, formed by third surface forming parts 7a and 7b; and a fourth surface, which is the farthest from the magnetic disk, formed by a fourth surface forming part 8.

In a specific embodiment, the first to the fourth surfaces are substantially parallel planes. The depth dl of the second surface formed by the second surface forming part 6a as measured from the first surface formed by the first surface forming part 5a is about 5 nm, the depth d2 of the third surface formed by the third surface forming part 7a as measured from the second surface formed by the second surface forming part 6a is about 150 nm, and the depth d3 of the fourth surface formed by the fourth surface forming part 8 as measured from the third surface formed by the third surface forming part 7a is about 850 nm.

In the specific embodiment, the magnetic head slider 1 is about 1.25 mm in length measured between the air inlet end 2 and the air outlet end 3, about 1.0 mm in width, and about 0.3 mm in thickness. The magnetic head slider 1 has a slider body 22 formed of alumina-titanium carbide. An alumina protective film 20, i.e., a head-protective layer for covering a coil and a shield film included in a magnetic head 9, is formed on the slider body 22 on a portion on the side of the air outlet end 3 of a boundary 21. The magnetic head 9 is held on the first surface forming part 5a; that is, the first surface forming part 5a forms a magnetic head mounting surface. At least the magnetic head mounting surface is coated with a carbon protective film or the like to protect the magnetic head 9 from corrosion.

Figure 4:
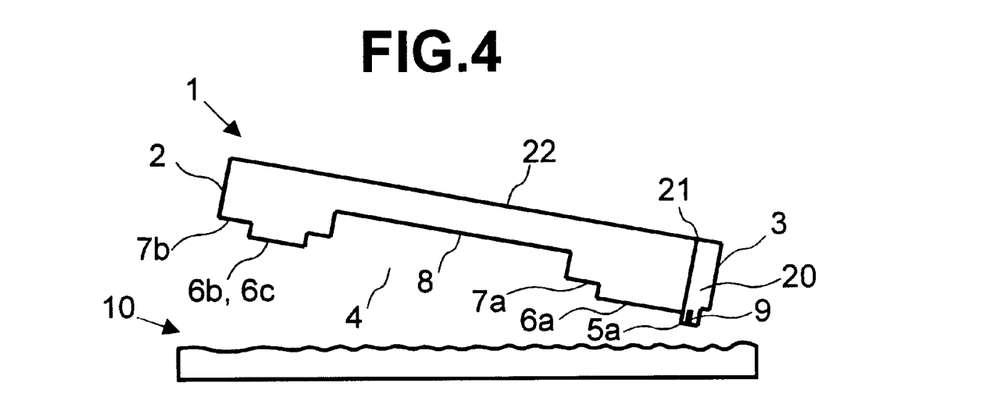
FIG. 4 is a simplified view schematically illustrating a positional relationship between the magnetic head slider and a magnetic disk when the magnetic head slider is in an operating state.

FIG. 4 shows a positional relationship between a magnetic disk 10 and the magnetic head slider 1 of the first embodiment when operating in a magnetic disk drive. Air flow generated by the rotating magnetic disk 10 flows into a space between the magnetic head slider 1 and the magnetic disk 10. Then, a positive pressure is produced in spaces between the second surface forming parts 6a, 6b and 6c, and the magnetic disk 10. Consequently, the magnetic head slider 1 starts to float above the magnetic disk 10. The second surfaces formed by the second surface forming parts 6a, 6b and 6c correspond to the rail surfaces of conventional magnetic head sliders. The third surfaces formed by the third surface forming parts 7a and 7b correspond to the step bearing surfaces of such sliders. The fourth surface formed by the fourth surface forming part 8 correspond to the negative-pressure groove of such conventional magnetic head sliders. The negative-pressure groove is a recess which produces sub-atmospheric or sub-ambient pressure.

Generally, the magnetic head slider 1 is designed such that the flying height of the air inlet end 2 from the surface of the magnetic disk 10 is greater than that of the air outlet end 3 from the surface of the magnetic disk 10 when the magnetic disk slider 1 is in a flying state. Therefore, the first surface, i.e., the magnetic head mounting surface, formed by the first surface forming part 5a supporting the magnetic head 9 is closest to the magnetic disk 10.

The disposition of the first surface forming part 5a provided with the magnetic head 9 on the alumina protective film 20 formed near the air outlet end 3 to protect the magnetic head 9 is one feature of the first embodiment. The first surface forming part 5a has a width W of about 60 μm, a length L of about 20 μm, and a height of about 5 nm (see FIG. 2).

Generally, magnetic head sliders are formed of a sintered ceramic material, such as alumina-titanium carbide. The maximum surface roughness $R_p$ of the magnetic head slider 1 formed of alumina-titanium carbide is about 3 nm, and that of the alumina protective film 20 is 1 nm or below. It is substantially difficult to reduce the surface roughness of ceramic structures formed of alumina-titanium carbide, which is a ceramic material produced by sintering a mixture of a plurality of different kinds of materials.

Since the first surface forming part 5a is formed only on the alumina protective film 20, the surface closest to the magnetic disk 10 has a low maximum surface roughness. It is important that the surface holding the magnetic head 9, to be kept closest to the magnetic disk 10, has a low surface roughness to reduce flying height without contacting the magnetic disk.

Although the protective film for protecting the magnetic head 9 is formed of alumina in the first embodiment, the protective film may be formed of any suitable material other than alumina, provided that the protective film of the material can be formed in a low surface roughness. Possible materials for forming the protective film are, for example, SiC and $SiO_2$.

In the first embodiment, the depth d1 of the second surface formed by the second surface forming part 6a from the first surface formed by the first surface forming part 5a is about 5 nm. Therefore, the second surface formed by the second surface forming part 6a does not come nearer to the magnetic disk than the first surface formed by the first surface forming part 5a, even if the maximum surface roughness of the magnetic head slider formed of alumina-titanium carbide is about 3 nm.

When the magnetic head slider is formed of alumna-titanium carbide, the depth d1 of the second surface formed by the second surface forming part 6a from the first surface formed by the first surface forming part 5a is desirably not smaller than 5 nm, otherwise the possibility of the second surface formed by the second surface forming part 6a coming closer to the surface of the magnetic disk than the first surface formed by the first surface forming part 5a increases when, for example, the crown of the magnetic head slider, or the pitch angle or attitude of the flying magnetic head slider, varies in a wide range. If the second surface formed by the second surface forming part 6a having a large surface roughness is the closest to the surface of the magnetic disk, the magnetic head slider will contact the magnetic disk even if the magnetic head slider is at a greater flying height.

If the depth d1 of the second surface formed by the second surface forming part 6a from the first surface formed by the first surface forming part 5a is excessively large, the spaces between the second surfaces (formed by the second surface forming parts 6a, 6b and 6c, which substantially serve as rail surfaces) and the magnetic disk increase. As a result, the negative pressure in those spaces decreases in magnitude which causes a decrease in the air bearing stiffness. Consequently, the range of variation of the flying height of the magnetic head slider increases, and the flying height decreases when the magnetic disk drive provided with the magnetic head slider is used at a place at a high altitude, which is undesirable in respect of the reliability of the magnetic disk drive. Thus, the depth dl of the second surface formed by the second surface forming part 6a from the first surface formed by the first surface forming part 5a should be in the range of about 5 nm to about 50 nm, more preferably, in the range of about 5 nm to about 30 nm.

In the first embodiment, the depth d2 of the third surface formed by the third surface forming part 7a as measured from the second surface formed by the second surface forming part 6a is about 150 nm, and the depth d3 of the fourth surface formed by the fourth surface forming part 8 as measured from the third surface formed by the third surface forming part 7a is about 850 nm. The depth d2 is preferably in the range of about 100 to 250 nm to make the flying height uniform substantially over the entire surface of the magnetic disk, and the depth d3 is preferably in the range of about 500 nm to about 1.5 $\mu$m to reduce the decrease of the flying height when the magnetic disk drive provided with the magnetic head slider is used at a place at a high altitude. Optimum values for the depths d2 and d3 are selected properly from values in those ranges taking into consideration the size and rotating speed of the magnetic disk.

As mentioned above, the first surface forming part 5a in the specific embodiment has a width W of about 60 $\mu$m and a length L of about 20 $\mu$m, which are far smaller than those of the corresponding portion of the conventional magnetic disk slider.

The second surface forming part 6a is formed so as to be contiguous with an end on the side of the air inlet end 2 and opposite sides of the first surface forming part 5a, and has a rear end lying near the vicinity of the air outlet end 3. The vicinity of the air outlet end 3 corresponds to a region extending at least to the boundary 21 (the first surface forming part 5a) between the slider body 22 of the magnetic head slider 1, and the alumina protective film 20 covering the magnetic head 9, desirably, a region extending beyond the magnetic head 9 to the air outlet end 3. The magnetic head slider 1 thus formed has an improved proximity ability to approach the magnetic disk, which will be described hereinafter.

The floating or flying performance of the magnetic head slider, particularly the stiffness of air film supporting the magnetic head slider, is desirably improved to deal with waviness, such as a runout having a long wavelength formed in the magnetic disk strained by clamping force. When the second surface forming part 6a extends to the vicinity of the air outlet end 3, the stiffness of the air film with respect to a pitching direction can be enhanced, which improves the ability to follow the runout.

An increase in the area of the second surface formed by the second surface forming part 6a in the vicinity of the air outlet end 3 is effective in enhancing the stiffness of the air film with respect to a pitching direction. Thus, it is desirable to extend the second surface forming part 6a to the boundary 21 as mentioned above in-the description of the first embodiment. A portion, extending toward the air outlet end 3 beyond the boundary 21, of the second surface forming part 6a is desirably beveled so as to be sloped toward an end of the magnetic head 9 on the side of the outlet end 3 to prevent the second surface forming part 6a from contacting the magnetic disk even if the magnetic head slider 1 is inclined to the air flow(s).

471 Formation of the surface 5a provided with the magnetic head 9, to be kept close to the surface of the magnetic disk 10 in a short length, is effective in improving the ability to follow minute wavinesses (micro-wavinesses) having short lengths in the range of about 0.1 mm to about 1 mm shorter than the length of 1.25 mm of the magnetic head slider 1, because the minimum wavelength of the waviness of the magnetic disk that can be followed by the magnetic head slider is limited by the geometrical dimensions of the surface holding the magnetic head, to be brought closest to the surface of the magnetic disk; that is, the surface 5a provided with the magnetic head 9 is desirably small to follow the wavinesses having short wavelength of the magnetic disk 10.

When the magnetic head slider, similarly to the conventional magnetic head slider, is provided with the magnetic head in the second surface formed by the second surface forming part 6a (rail surface), a rail surface for generating a positive pressure to make the magnetic head slider float is small if the second surface formed by the second surface forming part 6a is reduced to improve the ability to follow the wavinesses of short wavelengths of the magnetic disk. Consequently, the magnetic head slider cannot be lifted up at a desired flying height from the magnetic disk.

In the first embodiment, the first surface formed by the first surface forming part 5a, which is positioned close to the magnetic head, is formed with the length L of 20 $\mu$m to reduce the minimum wavelength that can be followed by the magnetic head slider to about 1/5 of 0.1 mm. If the length L of the first surface forming part 5a is long and a high lifting force is generated by the first surface forming part 5a, lifting force generated by the second surface forming part 6a decreases and hence the pitch stiffness of the air film decreases, whereby the ability to follow runouts is reduced. Therefore, the length L of the first surface forming part 5a is desirably not greater than 0.1 mm corresponding to the minimum wavelength of micro-wavinesses, preferably, 50 μm or below, to avoid generating an excessively high lifting force.

Although the reduction of the length L of the first surface forming part 5a is effective in improving the ability to follow micro-wavinesses, the size of a coil included in the magnetic head 9 places a restriction on the reduction of the length L of the first surface forming part 5a. A suitable length L of the first surface forming part 5a is in the range of about 10 to about 100 μm, preferably, in the range of about 10 to about 50 μm.

In the specific embodiment, the lower limit of about 10 μm of the range of the length L is determined taking into consideration the respective thicknesses of the components of the magnetic head including upper and lower shield films, an MR film and a coil, and tolerances in the positioning accuracies in fabricating the magnetic head. Thus, the smaller the components of the magnetic head are, the smaller the thicknesses and the tolerances are.

The runout and micro-waviness are circumferential wavinesses of the magnetic disk. The magnetic disk has radial wavinesses in addition to the circumferential wavinesses. An proximity ability to approach a radial waviness is not affected significantly by the flying ability of the magnetic head slider. The width W of the surface provided with the magnetic head affects the proximity ability geometrically.

Formation of the surface provided with the magnetic head in a small width W is effective in improving the proximity ability to approach a radial waviness. In the first embodiment, the width W of the first surface formed by the first surface forming part 5a is 60 μm. Although the narrower width is desirable, the size of the coil and the shield films of the magnetic head 9 places restriction on the reduction of the width W. Preferably, the width W is in the range of about 30 to about 60 μm in the specific embodiment. The lower limit of 30 μm of the range for the width W corresponds to the smallest width of a component among those of the components of the magnetic head, which is generally the width of the shield film.

It is a feature of the first embodiment that the width W of the first surface forming part 5a forming the first surface provided with the magnetic head is at least equal to the length L of the same (W/L>1), and preferably is greater than the length L (W/L>1).

Figure 5:
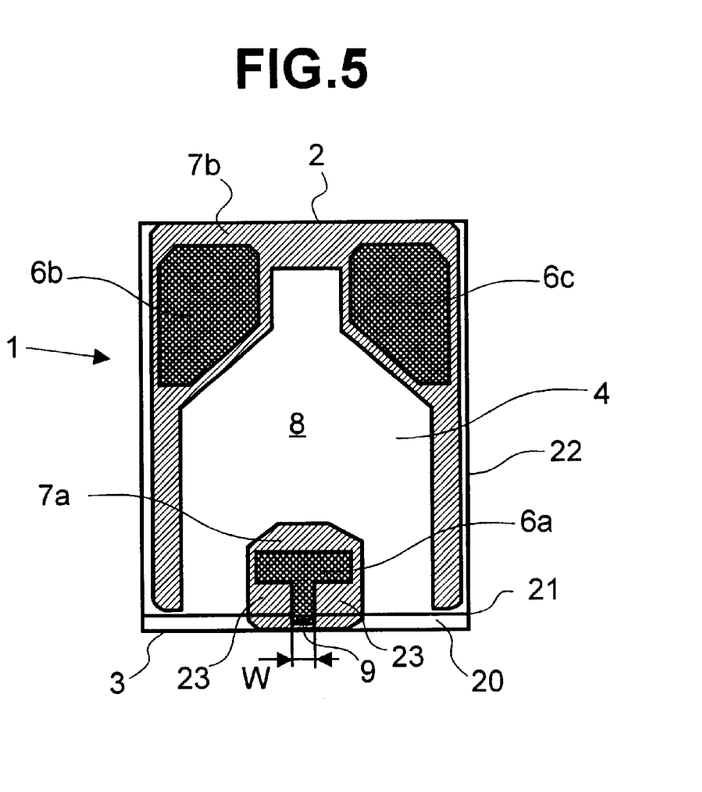
FIG. 5 is a plan view of a magnetic head slider in a comparative example.

FIG. 5 shows a magnetic head slider 1 in a comparative example to be compared with the magnetic head slider 1 in the first embodiment. As shown in FIG. 5, a second surface forming part 6a, i.e., a center rail of the magnetic head slide 1 has a shape resembling the letter T formed by cutting opposite side portions 23 of a rectangular land by a depth on the order of about 5 nm by ion-beam milling. The width of a leg portion of the T-shaped second surface forming part 6a is equal to the width W of about 60 μm of a magnetic head 9. Calculated variation of the flying height of the magnetic head slider 1 in the first embodiment of FIG. 1 and that of the flying height of the magnetic head slider 1 in the comparative example of FIG. 5 according to the waviness of a magnetic disk are shown in Table 1.

A method of determining the variation of the flying height according to the waviness of the magnetic disk will be explained. The frequency characteristics of the magnetic head sliders 1 in the first embodiment and the comparative example (flying height variations Δh with a waviness approximated by a sine curve having a frequency and an amplitude for an entire frequency range) were calculated by a method of perturbation. The calculated results, a measured runout of the magnetic disk measured by an LDV, and the amplitude of the micro-waviness were integrated to determine variations of flying height for frequencies. The variation of the flying height for the waviness of the magnetic disk was represented by the statistical sum of those values. The nominal flying height $h_{gap}$ of the magnetic disk sliders 1 at a position of the magnetic head in the first embodiment and the comparative example was 10 nm (see FIG. 6).

As shown in Table 1, the flying height variations of the magnetic heads of the magnetic head slider in the first embodiment and the magnetic head slider in the comparative example were 0.66 nm and 2.18 nm, respectively. The flying height variations of the magnetic heads of the magnetic head slider in the first embodiment and the magnetic head slider in the comparative example at the minimum flying height $h_{min}$ were 0.81 nm and 2.29 nm, respectively. The flying height variation of the magnetic head slider in the first embodiment was about 30% as compared to about 35% of that of the magnetic head slider in the comparative example.

TABLE 1

|  | Flying height variation at $h_{gap}$ (nm) | Flying height variation at $h_{min}$ (nm) |
| --- | --- | --- |
| Magnetic head slider of the invention (FIG. 1) | 0.66 | 0.81 |
| Conventional magnetic head slider (FIG. 5) | 2.18 | 2.29 |
| Reduction ratio (%) | 30 | 35 |

Since the nominal flying height $h_{gap}$ of the magnetic head 9 of each of the magnetic head sliders in the first embodiment and the comparative example was 10 nm, the reduction of the flying height variation from 2.18 nm for the comparative example to 0.66 nm for the first embodiment is a very effective improvement.

The flying height variation of the magnetic head slider in the first embodiment is smaller than that of the magnetic head slider in the comparative example because the second surface forming part 6a, i.e., the center rail, extending to the boundary 21 has the fixed width throughout the entire length and hence the air film has a high stiffness with respect to the pitching direction.

Figure 6:
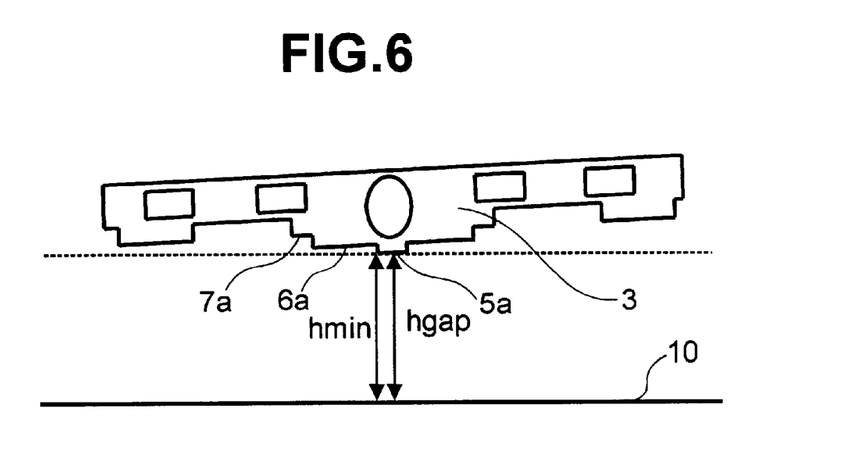
FIG. 6 is an end view of the magnetic head slider in the first embodiment as viewed from an air outlet end.

FIG. 6 is an end view of the magnetic head slider in the first embodiment as viewed from the air outlet end 3. The magnetic head slider 1 in the first embodiment is provided with the magnetic head 9, and the first surface forming part 5a, which approaches most closely to the surface of the magnetic disk 10, has a narrow width of about 60 μm. As a result, the difference between the flying height $h_{gap}$ of the magnetic head 9 and the minimum flying height $h_{min}$ at the edge of the first surface forming part 5a is small even if the magnetic head slider tilts in the rolling direction.

As apparent from the foregoing description, the variation of the flying height of the magnetic head slider with respect to the rolling direction is small, and the magnetic head slider has an improved proximity ability to approach the magnetic disk. Thus, the magnetic head slider of the present invention achieves both the reduction of the variation of flying height with respect to the rolling direction and the improvement of proximity ability to approach the magnetic head, which has been difficult to achieve by the conventional magnetic head slider. Since the present invention thus reduces the possibility of the magnetic head slider coming into contact with the magnetic disk, the flying height can be reduced, maintaining the reliability of the magnetic disk drive.

Figure 7:
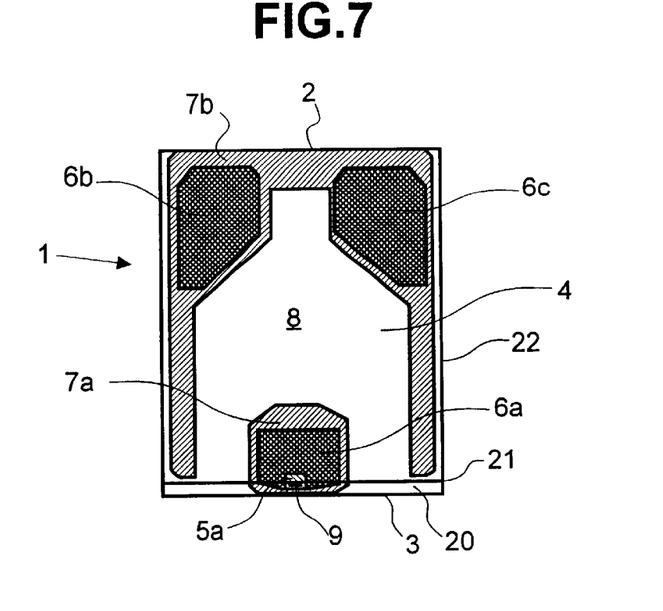
FIG. 7 is a plan view of a magnetic head slider in a second embodiment according to the present invention.

FIG. 7 is a plan view of a magnetic head slider in a second embodiment according to the present invention. A first surface forming part 5a of the magnetic head slider in the second embodiment extends not only on an alumina protective film 20 but also slightly on a slider body 22. Generally, when fabricating a magnetic head slider, flying height is measured by a flying height tester based on the principle of optical interference. However, the measurement of the flying height of the alumina protective film 20 is difficult because the alumina is transparent. Therefore, the first surface forming part 5a is extended slightly on the slider body 22 of alumina-titanium carbide, and the flying height of a portion of the first surface forming part 5a extending on the slider body 22 is measured.

Figure 8:
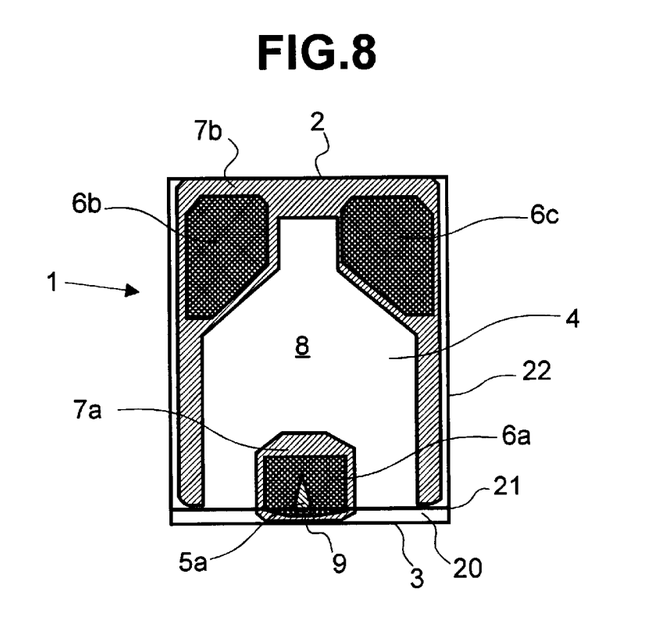
FIG. 8 is a plan view of a magnetic head slider in a third embodiment according to the present invention.

FIG. 8 is a plan view of a magnetic head slider in a third embodiment according to the present invention. A first surface forming part 5a of the magnetic head slider in the third embodiment, similarly to that of the magnetic head slider in the second embodiment extends not only on an alumina protective film 20 but also slightly on a slider body 22. A portion, extending on the slider body 22, of the first surface forming part 5a is tapered at an acute angle toward an air inlet end 2 of the slider body 22 to reduce the possibility that dust which may have entered the space between the first surface forming part 5a and a magnetic disk 10 would reach a magnetic head placed on the first surface forming part 5a. Thus, the magnetic head slider reduces the possibility that the magnetic head 9 would be damaged.

Figure 9:
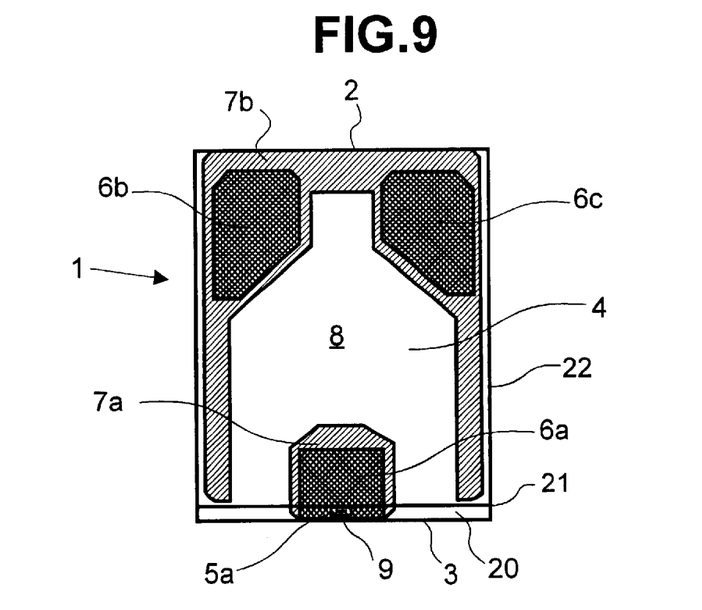
FIG. 9 is a plan view of a magnetic head slider in a fourth embodiment according to the present invention.

FIG. 9 is a plan view of a magnetic head slider in a fourth embodiment according to the present invention. A first surface forming part 5a of the magnetic head slider in the fourth embodiment, similarly to that of the magnetic head slider in the first embodiment, is formed on an alumina protective film 20. A side, on the side of an air outlet end 3, of the first surface forming part 5a is contiguous with a second surface forming part 6a, and the second surface forming part 6a extends to the air outlet end 3.

Since such construction of the magnetic head slider forms an air film having a high stiffness with respect to a pitching direction, the magnetic head slider has an improved proximity ability to approach a magnetic disk.

Figure 10:
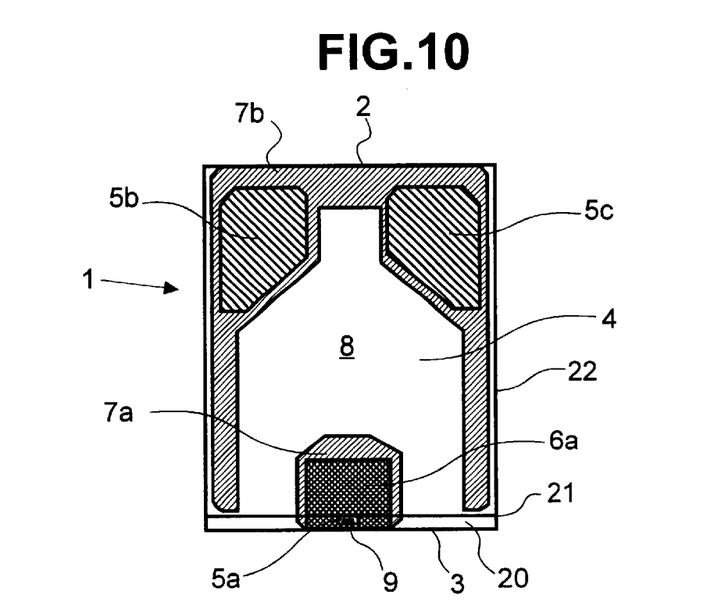
FIG. 10 is a plan view of a magnetic head slider in a fifth embodiment according to the present invention.

FIG. 10 is a plan view of a magnetic head slider in a fifth embodiment according to the present invention. The magnetic head slider in the fifth embodiment is identical in shape in a plane with that in the fourth embodiment. A first surface forming parts 5b and 5c and a second surface forming part 6a form a rail surface in the fifth embodiment, whereas second surfaces formed by second surface forming parts 6a, 6b and 6c are in the same plane to form a rail surface in the fourth embodiment. First surfaces formed by the first surface forming parts 5b and 5c are flush with a magnetic head mounting surface formed by a first surface forming part 5a. The depth of a rail surface formed by the second surface forming part 6a near an air outlet end 3 from the magnetic head mounting surface formed by the first surface forming part 5a is about 5 nm. The fifth embodiment, similarly to the first to the fourth embodiment, reduces the variation of flying height with respect to a rolling direction and has an improved proximity ability to approach a magnetic disk.

At least the first surface forming parts 5a, 5b and 5c of the fifth embodiment are covered with a carbon protective film.

Figure 11:
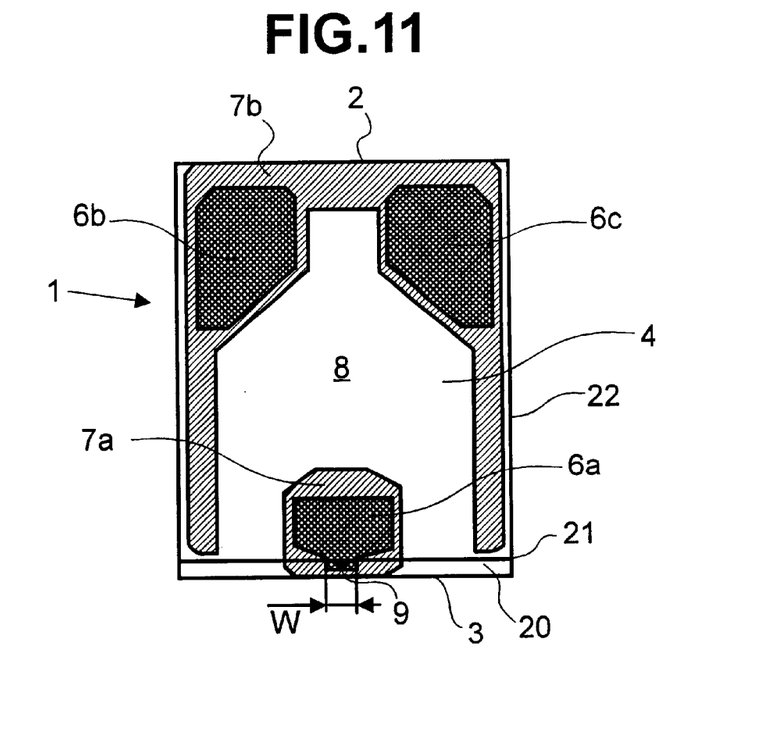
FIG. 11 is a plan view of a magnetic head slider in a sixth embodiment according to the present invention.

FIG. 11 is a plan view of a magnetic head slider in a sixth embodiment according to the present invention. While each of the magnetic head sliders in the first to the fifth embodiment has four substantially parallel planes, the magnetic head slider in the sixth embodiment has three substantially parallel planes. The magnetic head slider in the sixth embodiment has second surface forming parts 6a, 6b and 6c forming a rail surface, third surface forming parts 7a and 7b, and a negative-pressure groove 8.

A narrow end portion, near an air outlet end 3, of the second surface forming part 6a is a feature of the sixth embodiment. The peripheral edges of the second surface forming part 6a are surrounded by the third surface forming part 7a. A magnetic head 9 included in the sixth embodiment, differing from those of the foregoing embodiments, is not spaced in the direction of depth from the second surface forming part 6a and the magnetic head mounting surface is flush with the rail surface. Therefore, the pitch angle of the flying magnetic head slider is desirably larger to ensure that a portion, in the vicinity of the air outlet end 3, of the magnetic head slider is held at the lowest position. The number of ion-beam milling processes needed for forming the magnetic head slider in the sixth embodiment is less by one than that of ion-beam milling processes needed for forming the magnetic head sliders in the foregoing embodiments.

Figure 12:
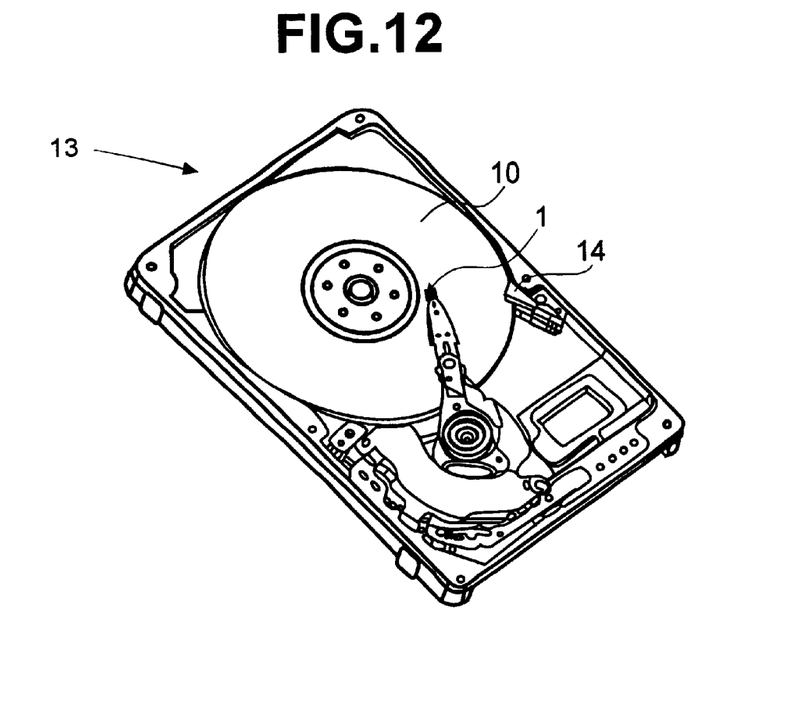
FIG. 12 is a perspective view of a magnetic disk drive with a loading/unloading mechanism.

Since the rail surface and the magnetic head mounting surface are included in the same plane, a rear end portion of the second surface forming part 6a is tapered toward the air outlet end 3 by beveling opposite sides of the rear end portion of the second surface forming part 6a excluding a portion corresponding to the magnetic head 9 so as to extend obliquely from a boundary 21 toward the air outlet end 3 to prevent portions, on the opposite sides of the magnetic head 9, of the rail surface from contacting the magnetic disk. The magnetic head slider 1 is attached to a free end portion of a support arm as shown in FIG. 12, and the support arm is turned to locate the magnetic head slider 1, and hence the magnetic head slider 1 tilts at an angle to air flow(s). Therefore, the rail surface is desirably cut, taking into consideration the tilt of the magnetic head slider, to satisfy both forming the rail surface in a large area and avoiding the magnetic head slider coming into contact with a magnetic disk 10. The opposite sides of the rear end portion of the second surface forming part 6a may be rounded instead of being linearly beveled.

It is desirable, in view of the stiffness of the air film with respect to the pitch direction, to extend the entire rear end portions of the rail surface to the boundary 21 similarly to that of the first embodiment. Although the rear end of the second surface forming part 6a of the sixth embodiment is spaced from the boundary 21, the area of a portion, on the side of the air outlet end, of the rail surface of the sixth embodiment is greater than that of the magnetic head slider in the comparative example shown in FIG. 5, and hence the stiffness of the air film with respect to the pitch direction can be enhanced.

It is preferable to prevent contact between the magnetic disk and the magnetic head slider 1 by reducing the width of the portion of the rail surface on the side of the magnetic head 9 (alumina protective film 20), i.e., on the side of the air outlet end 3, to secure a sufficient stiffness with respect to the pitch direction by forming a portion of the rail surface on the side of the air inlet end 2 in a large width, and to increase the width of a width changing part of the rail surface continuously so that a portion of the rail surface on the side of the air outlet end 3 has a large area. When a portion of the rail surface corresponding to the alumina protective film 20 is formed in a fixed width, and the width of a portion, between the boundary 21 and the air inlet end 2, of the rail surface is increased, contact between the magnetic disk and the end portion of the rail surface can be more effectively prevented, which is true of the other embodiment.

Although side rails formed by the second surface forming parts 6b and 6c and the third surface forming part 7b extend substantially to the air outlet end 3 in the foregoing embodiments, the present invention has no direct relation with the length of the side rails and hence the side rails may be shorter if negative pressure in the negative-pressure groove permits.

FIG. 12 shows a magnetic disk drive 13 provided with one of the magnetic head sliders 1 in the first to the sixth embodiment of the present invention. The magnetic disk drive 13 is provided with a loading-and-unloading mechanism. When the magnetic disk drive 13 is stopped, the magnetic head slider 1 rests on a ramp 14. While the magnetic disk drive 13 is in operation, the magnetic head slider 1 is moved over a magnetic disk 10 for recording or reproducing operation. Since the magnetic head slider of the present embodiment reduces the variation of the flying height with respect to the rolling direction and has an improved proximity ability to approach the magnetic disk, the flying height of the magnetic head slider can be reduced and the magnetic disk drive is capable of high-density information recording.

As described above, the magnetic head slider embodying the present invention reduces the variation of the flying height with respect to the rolling direction and has an improved proximity ability to approach the magnetic disk, the flying height of the magnetic head slider can be reduced while maintaining the reliability of the magnetic disk drive, and the magnetic disk drive is capable of high-density information recording.

The magnetic head slider of the present invention can be incorporated in a magnetic disk drive which also includes a recording medium for recording information. The magnetic head of the magnetic head slider writes information to the recording medium.

The above-described arrangements of apparatus and methods are merely illustrative of applications of the principles of this invention and many other embodiments and modifications may be made without departing from the spirit and scope of the invention as defined in the claims. For instance, the present invention may be used for other types of head sliders, such as optical head sliders for optical disk drives or optomagnetic head sliders for optomagnetic disk drives. The scope of the invention should, therefore, be determined not with reference to the above description, but instead should be determined with reference to the appended claims along with their full scope of equivalents.

What is claimed is:

1. A magnetic head slider having a length between an air inlet end and an air outlet end, the magnetic head slider comprising:
  a magnetic head mounting surface configured to support a magnetic head to be spaced from a magnetic recording medium, the magnetic head mounting surface disposed near the air outlet end;
  a slider rail surface formed at a first predetermined positive depth from the magnetic head mounting surface in a direction away from the magnetic recording medium, the slider rail surface including an end portion disposed near the air outlet end, the end portion having a width perpendicular to the length of the magnetic head slider, the end portion extending to the magnetic head mounting surface near the air outlet end;
  a step bearing surface formed in a portion of the slider rail surface disposed toward the air inlet end and at a second predetermined positive depth from the slider rail surface in the direction away from the magnetic recording medium; and
  a negative-pressure groove having a recessed surface at a third predetermined positive depth from the step bearing surface in the direction away from the magnetic recording medium.

2. The magnetic head slider of claim 1 wherein the end portion of the slider rail surface extends with a uniform width to the magnetic head mounting surface.

3. The magnetic head slider of claim 1 wherein the magnetic head mounting surface comprises a surface of a protective film which protects the magnetic head.

4. The magnetic head slider of claim 3 wherein the protective film comprises a carbon protective film.

5. The magnetic head slider of claim 1 wherein the slider rail surface has a depth from the magnetic head mounting surface in a range of about 5 nm to about 50 nm.

6. The magnetic head slider of claim 1 wherein the magnetic head mounting surface has a width and a length which is shorter than the width.

7. The magnetic head slider of claim 1 wherein the magnetic head mounting surface has a width of at most about 60 $\mu$m.

8. The magnetic head slider of claim 1 wherein the magnetic head mounting surface has a length of at most about 50 $\mu$m.

9. The magnetic head slider of claim 1 wherein at least a first side of the magnetic head mounting surface facing the air inlet end and two opposite sides of the magnetic head mounting surface each disposed adjacent the first side thereof are contiguous with the slider rail surface.

10. The magnetic head slider of claim 1 wherein the magnetic head slider includes a slider body and a magnetic head, and wherein the magnetic head mounting surface comprises a surface of a protective film which is coupled to the slider body, and wherein the magnetic head mounting surface extends over a portion of the protective film and a portion of the slider body.

11. The magnetic head slider of claim 10 wherein the magnetic head mounting surface extends over a portion of the slider body forming a tapered mounting surface portion narrowing in a direction toward the air inlet end.

12. A magnetic head slider having a length between an air inlet end and an air outlet end, the magnetic head slider comprising:
  a magnetic head;
  a magnetic head mounting surface configured to support a magnetic head to be spaced from a magnetic recording medium, the magnetic head mounting surface being formed on a protective film disposed near the air outlet end and protecting the magnetic head;
  a slider rail surface formed at a first predetermined positive depth from the magnetic head mounting surface in a direction away from the magnetic recording medium, the slider rail surface including an end portion disposed near the air outlet end, the end portion extending at least to the protective film protecting the magnetic head near the air outlet end;

a step bearing surface formed in a portion of the slider rail surface disposed toward the air inlet end and at a second predetermined positive depth from the slider rail surface in the direction away from the magnetic recording medium; and a negative-pressure groove having a recessed surface at a third predetermined positive depth from the step bearing surface in the direction away from the magnetic recording medium.

13. The magnetic head slider of claim 12 wherein the end portion of the slider rail surface extends beyond the magnetic head toward the air outlet end.

14. The magnetic head slider of claim 13 wherein the end portion of the slider rail surface includes a beveled extension extending from a boundary of the protective film beyond the magnetic head toward the air outlet end and narrowing in width toward the air outlet end.

15. The magnetic head slider of claim 13 wherein the end portion of the slider rail surface extends with a uniform width to the boundary of the protective film before narrowing in width in the beveled extension.

16. The magnetic head slider of claim 12 wherein the end portion of the slider rail surface extends to the air outlet end, and wherein the magnetic head mounting surface has a side facing the air outlet end and being contiguous with the end portion of the slider rail surface.

17. A magnetic head slider having a length between an air inlet end and an air outlet end, the magnetic head slider comprising:

a magnetic head mounting surface configured to support a magnetic head to be spaced from a magnetic recording medium, the magnetic head mounting surface disposed near the air outlet end and having a uniform width;

a slider rail surface including an end portion disposed near the air outlet end, the end portion extending to the magnetic head mounting surface near the air outlet end, the end portion including a tapered part which has a width continuously increasing from one end adjacent the magnetic head mounting surface and having an identical width as the magnetic head mounting surface in a direction toward the air inlet end; a step bearing surface formed in a portion of the slider rail surface disposed toward the air inlet end and at a first predetermined positive depth from the slider rail surface in the direction away from the magnetic recording medium; and a negative-pressure groove having a recessed surface at a second predetermined positive depth from the step bearing surface in the direction away from the magnetic recording medium.

18. The magnetic head slider of claim 17 wherein the end portion of the slider rail surface has a uniform part which extends with a uniform width from the tapered part to another end of the end portion in a direction toward the air inlet end.

19. The magnetic head slider of claim 17 wherein the slider rail surface is flush with the magnetic head mounting surface.

20. The magnetic head slider of claim 17 wherein the width of the tapered part increases linearly from the end adjacent the magnetic head in the direction toward the air inlet end.

* * * * *